US005987469A

United States Patent [19]
Lewis et al.

[11] Patent Number: 5,987,469
[45] Date of Patent: Nov. 16, 1999

[54] METHOD AND APPARATUS FOR GRAPHICALLY REPRESENTING INFORMATION STORED IN ELECTRONIC MEDIA

[75] Inventors: James D. Lewis, Wyckoff, N.J.; Bogdan N. Reznik, Brooklyn, N.Y.; Eran Librach, Fair Lawn, N.J.; Bryce H. Bonnet, New Milford, N.J.; Nancy J. Lewis, Wyckoff, N.J.

[73] Assignee: Micro Logic Corp., South Hackensack, N.J.

[21] Appl. No.: 08/855,553

[22] Filed: May 13, 1997

Related U.S. Application Data

[60] Provisional application No. 60/017,400, May 14, 1996.

[51] Int. Cl.[6] ........................................... G06F 9/00
[52] U.S. Cl. ............................. 707/102; 707/104
[58] Field of Search .................... 707/100, 200, 707/104

[56] References Cited

U.S. PATENT DOCUMENTS

| | | | |
|---|---|---|---|
| 5,058,144 | 10/1991 | Fiala et al. | 375/240 |
| 5,551,022 | 8/1996 | Tariq et al. | 707/104 |
| 5,606,669 | 2/1997 | Bertin et al. | 395/200.53 |
| 5,644,763 | 7/1997 | Roy | 707/101 |
| 5,724,576 | 3/1998 | Letourneau | 707/100 |

OTHER PUBLICATIONS

Microsoft® Windows™ For Workgroups User's Guide, p. 111, Copyright 1985–1993.
WinSurfer™ and tree Viz™ program webpages.

*Primary Examiner*—Paul R. Lintz
*Assistant Examiner*—John Gladstone Mills, III
*Attorney, Agent, or Firm*—Lerner, David, Littenberg, Krumholz & Mentlik, LLP

[57] ABSTRACT

A method and apparatus is provided for displaying nested rectangles which graphically illustrate the directories and files located in a storage medium such a computer hard disk drive or the nodes of a tree data structure. The sizes of the rectangles are proportional to the size of the directory or file they represent, and the rectangles are nested in a recursive manner in accordance with the branch structure of the directories and files on the storage media. Preferably, the dimensions of the rectangles are chosen to maximize the number of rectangles, especially those capable of displaying the names of the directories and files. Yet further, the invention preferably assigns colors to the rectangles based upon certain criteria and suppresses directories or files from being shown if their rectangles will be too small to be accurately perceived.

26 Claims, 14 Drawing Sheets

METHOD AND APPARATUS FOR GRAPHICALLY REPRESENTING INFORMATION STORED IN ELECTRONIC MEDIA

CROSS REFERENCE TO RELATED APPLICATIONS

The present application claims benefit of U.S. Provisional Application No. 60/017,400 filed May 14, 1996, the disclosure of which is hereby incorporated by reference herein.

BACKGROUND OF THE INVENTION

A common problem encountered by computer users is running out of storage space on media such as hard disk drives on personal computers. The need for additional storage space is increasing as more and more software is being sold on high density media such as CDs, and more and more information is being downloaded from on-line services such as the Internet. All of this contributes to a computer's primary magnetic media storage devices filling up faster than ever. Even with the use of data compression utilities, storage space fills quickly.

Concomitant with the need to find more storage space is the need to manage the massive amount of data being stored on computers. Users need to clear space for new data and programs. Thus, in order to make room for additional data, there is a need for a tool or method which can help a user efficiently and easily identify the best data to be removed.

Many prior art file managers like Microsoft Windows File Manager or Windows Explorer simply illustrate the tree-structure of the directories and files on the computer. These file managers do not allow the user to quickly, easily and graphically determine what files and directories of files are unnecessarily taking up too much space.

The WinSurfer product developed by Ben Shneiderman, Brian Johnson, David Turo and/or Marko Teittinen and belonging to the University of Maryland teaches the use of nested rectangles to illustrate the tree-structure and relative sizes of files and directories. Each directory or file is represented by a rectangle whose size is proportional to the size of the directory or file. If a particular directory contains other directories or files, then those other directories or files are shown as rectangles within the rectangle associated with the particular directory. Because the program apparently simply divides rectangles, many of the rectangles are very long and thin which makes it difficult to gauge the size of the rectangles in relation to one another. The product's failure to control the dimensions of the rectangles also makes it difficult to annotate the rectangles with meaningful information such as text. Further, the shapes of the rectangles are not chosen to maximize the number of rectangles displayed.

There is, therefore, a need for a file management system which addresses the disadvantages of the prior art.

SUMMARY OF THE INVENTION

The present invention addresses this need.

DETAILED DESCRIPTION OF THE PREFERRED EMBODIMENTS

Figure 1:
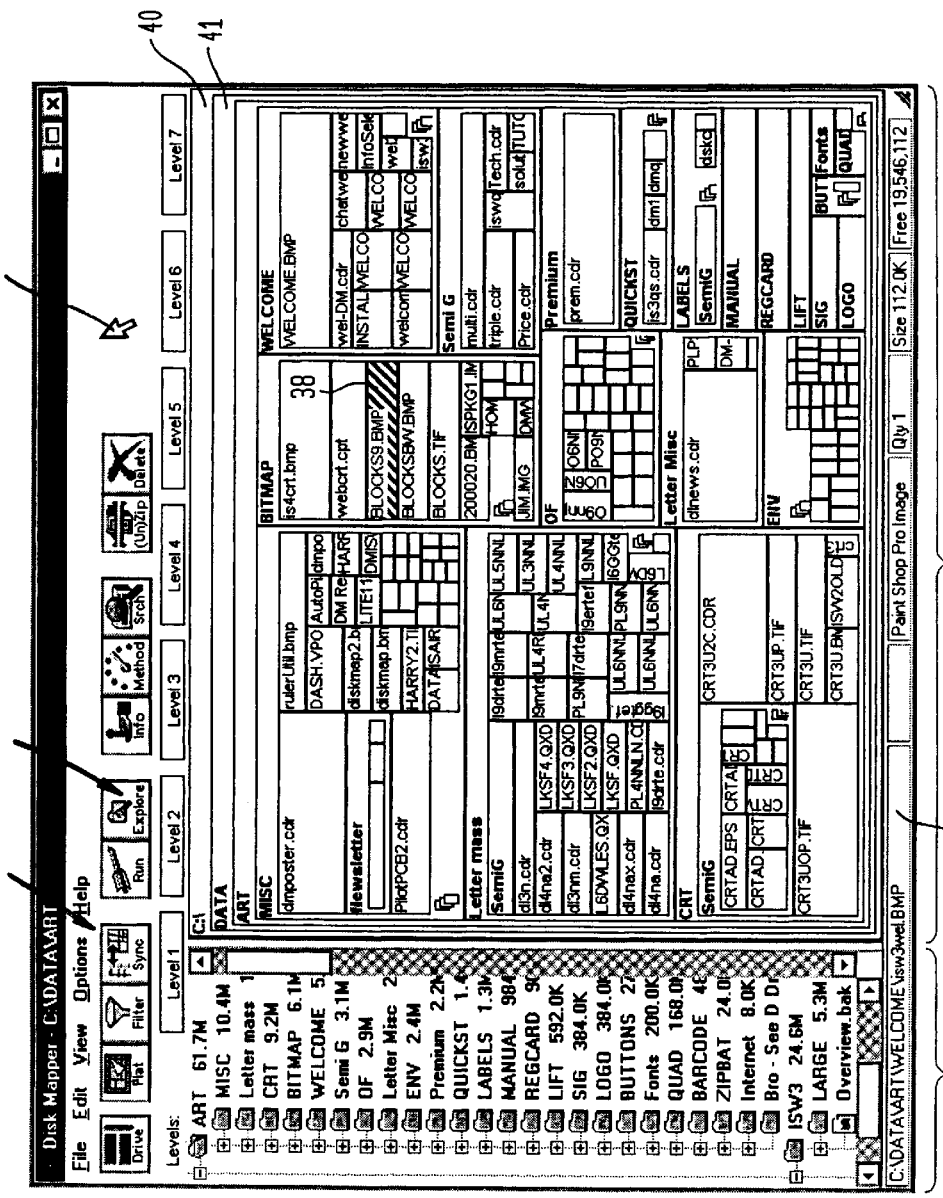
FIG. 1 is a sample screen output in accordance with the present invention.
Figure 2:
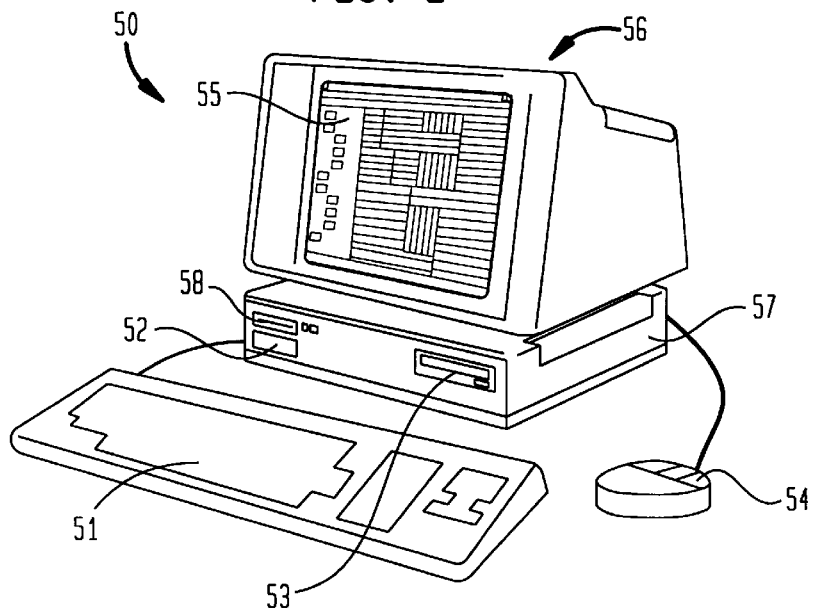
FIG. 2 is a schematic of an apparatus for implementing the present invention.

FIG. 1 represents a sample screen output in accordance with the present invention. An apparatus for implementing the present invention preferably includes a general computer as shown in FIG. 2, such as a personal computer. The computer may include the processing unit 57, keyboard 51, monitor 56 and screen 55. Potential storage media include hard drive 52, CD-ROM 53 or floppy disk drive 58. Screen 55 will be used in accordance with the present invention to graphically illustrate the contents of the storage media.

As shown in FIG. 1, screen image 10 includes a menu bar 36, toolbar 37, status bar 35, traditional file tree 30, and rectangle viewing area 20. Rectangle viewing area 20 shows the contents of a selected storage medium, such as the directories and files on hard drive 52 of computer 50.

Each directory and file is represented in the viewing area 20 as a rectangle, such as rectangle 40 which represents the root directory "c:" of the hard drive. The rectangles are nested to illustrate the directory/subdirectory/file manner in which information is stored on the hard drive. For example, as shown in traditional file tree 30, the ART directory includes a number of other directories such as MISC, Letter mass and CRT. As shown in rectangle viewing area 20, the directories MISC, Letter mass and CRT are represented by rectangles which are all nested within the rectangle labeled ART. Likewise, the files stored within the Letter mass directory, such as d13n.cdr, are represented as rectangles within the Letter mass rectangle.

The size of the rectangles are proportional to some characteristic of the corresponding directory or file, such as the amount of space occupied by the directory or file on the hard drive. For example, as shown in traditional file tree 30, the size of the MISC directory and all of its subdirectories and files is about 10.4 megabytes. The size of the WELCOME directory, on the other hand, is roughly half that at about 5 megabytes. Thus, in viewing area 20, the area occupied by the WELCOME rectangle is roughly half that of the MISC rectangle. Moreover, since the MISC directory occupies 10.4 of the 61.7 megabytes of the ART directory, the MISC rectangle occupies about 10.4/61.7 or about 16% of the space occupied by the ART directory. Because files do not contain other directories or files, the rectangles associated with the files do not contain other rectangles.

Each rectangle also displays additional information about its corresponding directory or file. For example, the name of the directory or file is displayed in each rectangle. The color of the rectangle may also convey additional information about the file such as its nesting depth.

As the cursor 39 is moved across screen display 10 by mouse 54, information about the rectangle currently under the cursor will be displayed in status bar 35. This information may include the file path, size, date, time, extension type and optionally any other details associated with the corresponding file or directory. The currently selected rectangle is highlighted such as by the use of diagonal bars 38. If the user is interested in a particular directory or file which he wishes to delete or compress, then the user may issue a simple command to accomplish this task or click one of the corresponding buttons on toolbar 37. The invention further allows a user to view or launch files by double clicking on the corresponding rectangle.

The method of generating rectangles in accordance with the present invention generally includes the steps of tiling the viewing area 20 with nested rectangles whose areas are proportional to the size of the files and subdirectories found in the first level (root) directory of the storage device. The dimensions of those rectangles are chosen in accordance with certain criteria. These rectangles are then tiled with the second level of directories and so on.

One preferred embodiment of the present invention includes the source code attached herewith and some of the major operations and steps performed by the source code are described below. However, for the sake of clarity and ease of understanding, the following description may deviate somewhat from the exact procedures and operations of the source code, particularly with respect to the order in which the steps are carried out.

1. Creation of tree data structure

Figure 3:
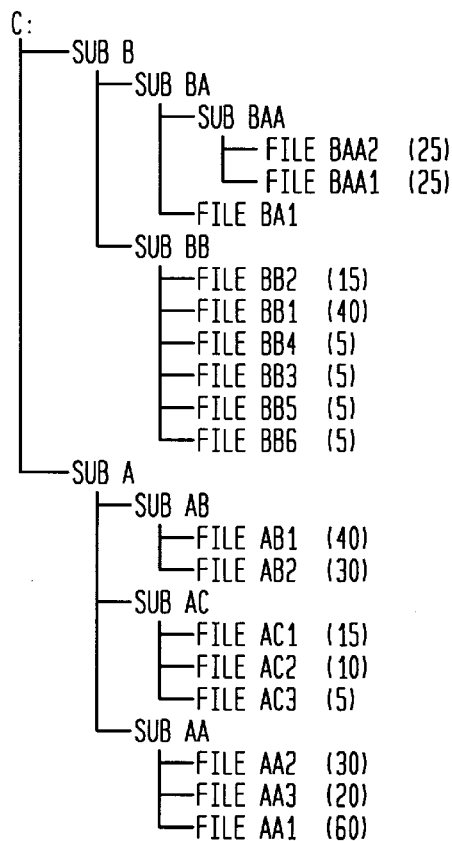
FIG. 3 is a representation of directories and files capable of being displayed in accordance with the present invention.

In order to efficiently tile viewing area 20, a tree data structure is created to represent all of the directories and files of the program. As popular personal computer platforms already store directories and files in a branched format, the data structure is modeled on that format. By way of example, FIG. 3 shows the directories and files on a hypothetical hard drive. For ease of reference, the name of each directory begins with the prefix "SUB" and the name of each file begins with the prefix "FILE". Each file is stored under at least one directory. Directories, in turn, are either stored directly under the root directory c: or are stored under one or more of the other directories. The numbers in parenthesis next to the files listed in FIG. 3 indicate the relative sizes of the files. Because directories are really pointers to other files and directories, it does not take much disk space to store the directories themselves as compared to the files they contain. Therefore, while the total amount of space occupied by the files under a directory may be quite large, the amount of storage space used to store the name of the directory is generally nominal.

Each directory and file is considered to represent one "node" of the tree data structure. In the case of directories, the node may contain many other nodes (in other words, files and other directories). If a first node contains one or more other node(s), then the first node is considered the "parent" of the one or more "child" node(s). Thus, node SUB B is the parent of child nodes SUB BA and SUB BB, and the node SUB BA is the parent of child nodes SUB BAA and FILE BA1.

Figure 4:
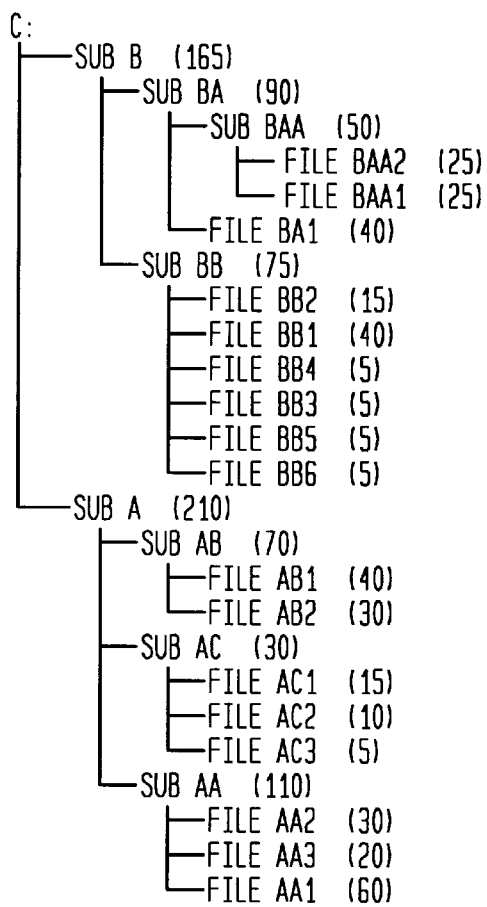
FIG. 4 is a representation of directories and files capable of being displayed in accordance with the present invention.

When the directories and files are stored in the tree data structure, the sizes of the files are stored as well. As the tree data structure is created, the program recursively calculates the total size (either logical or physical) of all the files under any particular node and stores the value in the tree. These sizes and any other information the user might use (including the names of the directories or files) are also stored in the tree data structure. For example, as shown in FIG. 4, each node includes the sum total of the size of all of the files under that directory.

Figure 5:
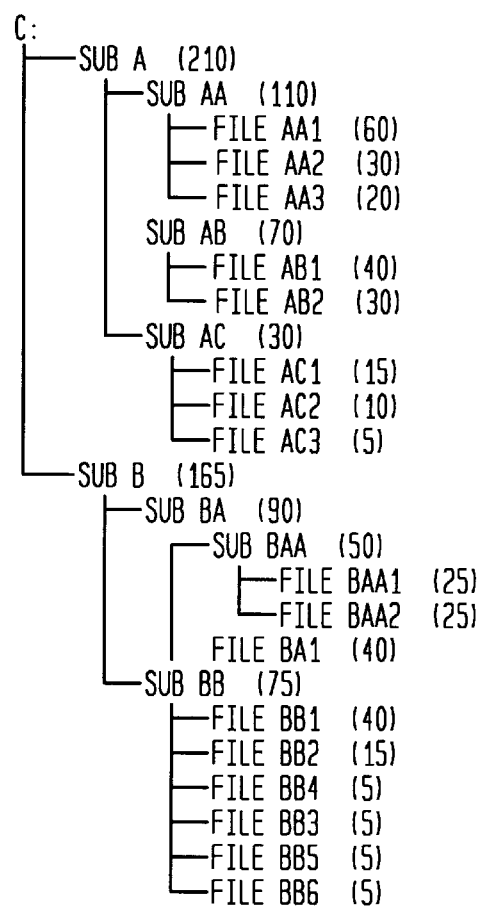
FIG. 5 is a representation of directories and files capable of being displayed in accordance with the present invention.

Once the sizes of the nodes have been stored, the tree data structure is sorted so that the first node is the largest. In other words, and as shown in FIG. 5, the nodes of the tree are sorted from largest to smallest which assists the program later on in determining how to tile.

Figure 6:
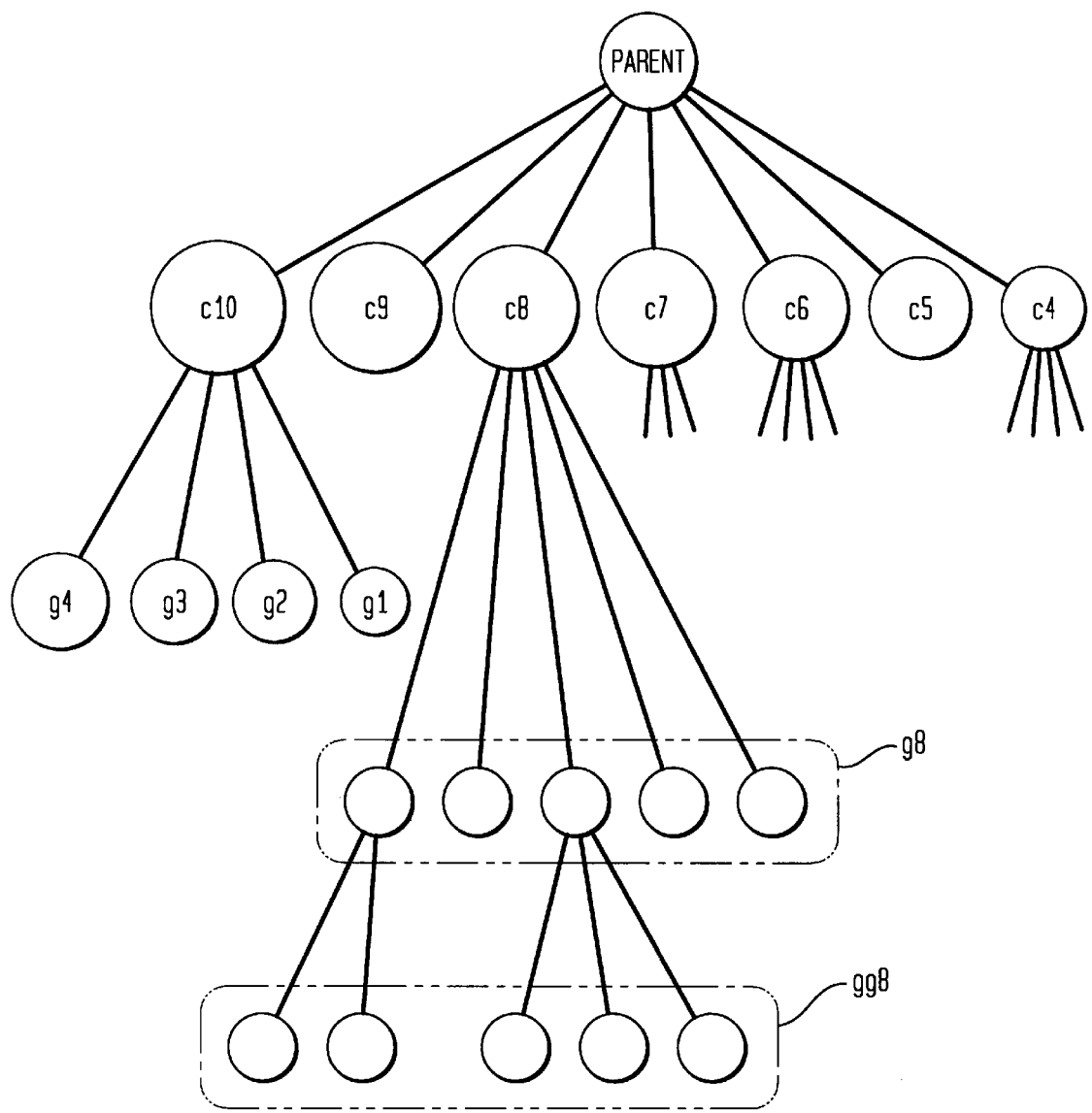
FIG. 6 is a schematic representation of a tree data structure to be displayed in accordance with the present invention.

To illustrate further steps of the method of the present invention, it is assumed that the invention will display the nodes under the Parent node shown in FIG. 6. The Parent Node has seven children under it, namely c10, c9, c8, c7, c6, c5 and c4. Some of these children are directories, namely c10, c8, c7, c6 and c4. The remaining children are files, namely c9 and c5. The children which are directories also have children. For example, c10's children are g4, g3, g2 and g1 and c8's children are collectively referred to as g8 (the prefix "g" refers to the fact that these children are grandchildren of the parent node). The grandchildren may in turn be directories and have other children as well, such as g8's children which are collectively referred to as gg8 (the prefix "gg" refers to the fact that these children are great-grandchildren of the parent node). The sizes of the nodes c4–c10 and g1–g4 are assumed to be equal to their reference numbers. For example, the total size of node c10 and all of its children is assumed to be 10 units, the total size of node c9 is assumed to be 9 units, the total size of node c8 and all of its children is assumed to be 8 units, and the total size of node g4 is assumed to be 4 units.

Figure 7:
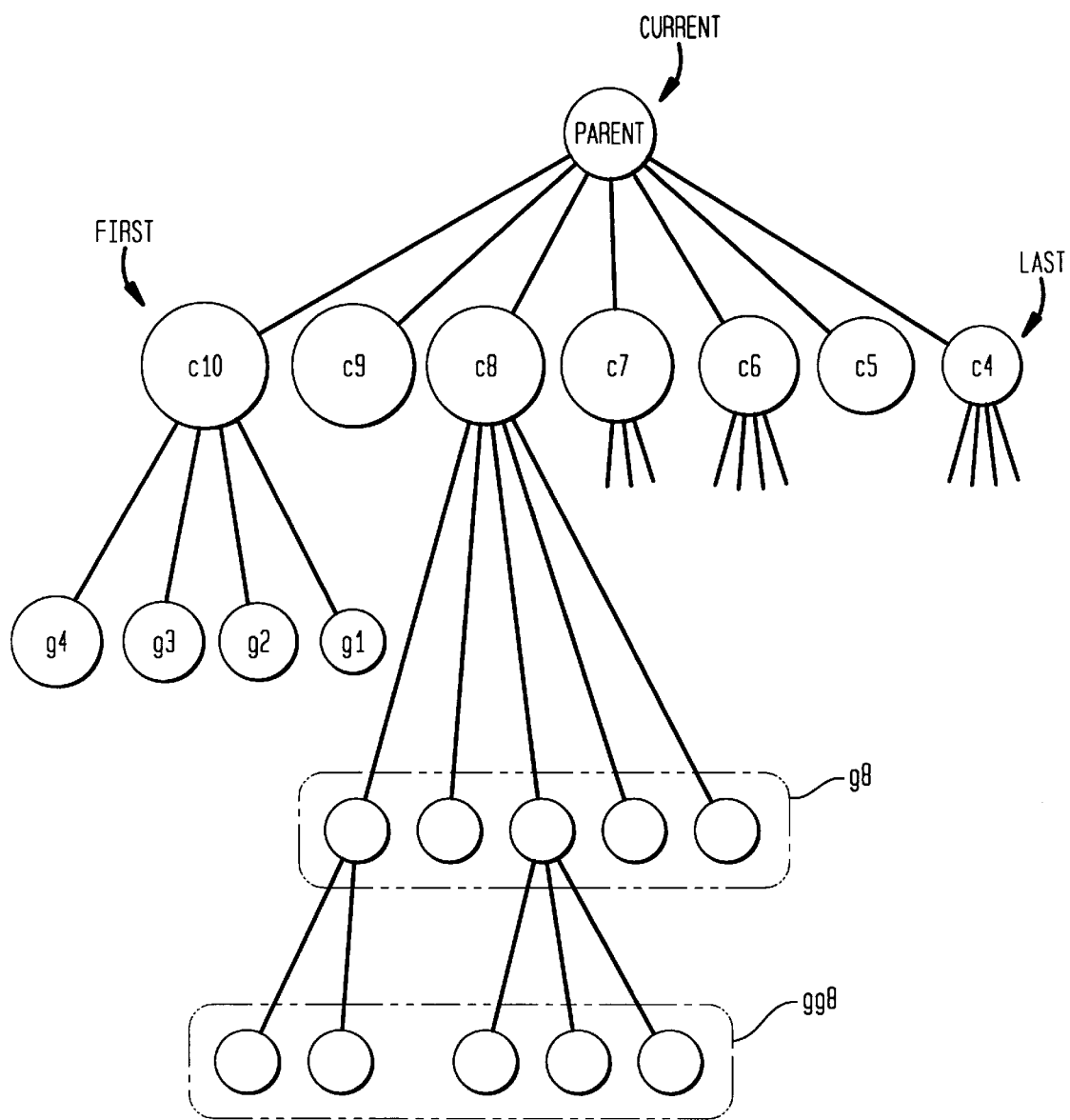
FIG. 7 is a schematic representation of a tree data structure to be displayed in accordance with the present invention.

The program travels through the tree to create the tiled images, and uses a pointer to keep track of the node it is currently working on. This node is called the "Current Node" and when the program starts, the parent node, and thus the current node, will point to the root directory of the storage medium. The Current Node pointer is illustrated in FIG. 7.

2. Creation of First Specified Rectangle

Figure 8:
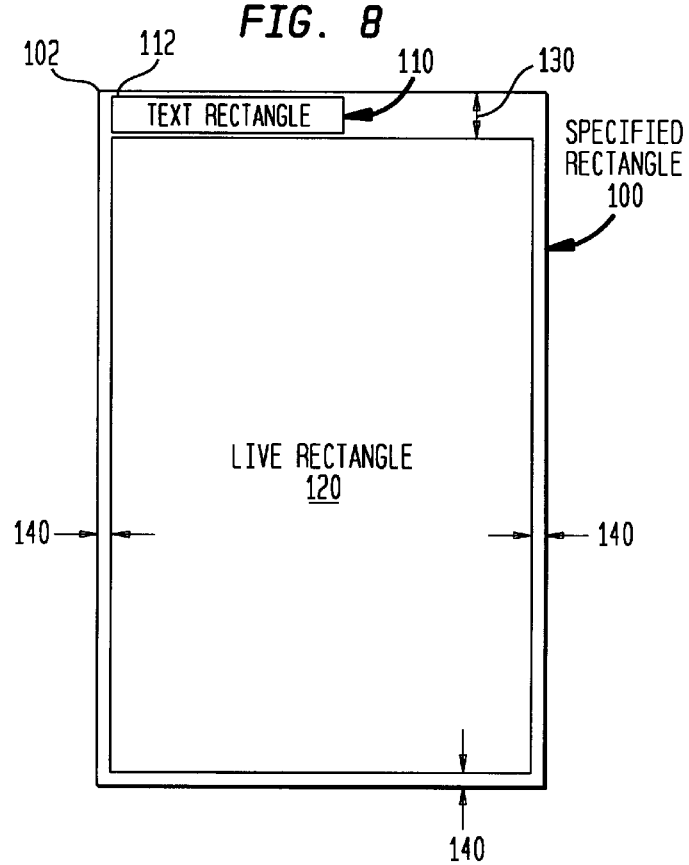
FIG. 8 is a schematic representation of a Specified Rectangle and its components in accordance with a preferred embodiment of the present invention.

Each time the program points to a new current node, the program determines the best location and dimensions of the rectangle used to illustrate that node in viewing area 20 (FIG. 1). This rectangle will show all the information associated with that particular node and is called the "Specified Rectangle." A sample Specified Rectangle 100 is shown in FIG. 8. When the program starts at the root node, the location and size of the Specified Rectangle 100 will be set equal to the shape of the viewing area 20.

3. Creation of Text Rectangle

Once the location and dimensions of the Current Node's Specified Rectangle are determined, a Text Rectangle 110 is created within the Specified Rectangle. The Text Rectangle 110 is used to display the name of the node associated with the Specified Rectangle 100 and its top-left corner 112 is placed adjacent to the top-left corner 102 of the Specified Rectangle. For optimal speed, the dimensions of the Text Rectangle are set equal to the estimated typical width and height of the names of the directories and files. For example, most if not all of the directories and file names in a Windows 3.11 platform are no greater than 12 characters long. Therefore, the dimensions of the Text Rectangle are preferably set equal to the height and width of a 12-character long word at a specific font size. Alternatively, the Text Rectangle could vary with the size of the Current Node's actual name.

If the Text Rectangle is too large to fit in the Specified Rectangle, then the name of the Current Node will either be partially displayed in the Specified Rectangle (i.e., "clipped") or not at all.

4. Creation of Live Rectangle

If the Current Node has children, then it is a directory and the rectangles of the Current Node's children will be displayed within the Specified Rectangle. Otherwise, if the Current Node has no children, then the Current Node is either a file or empty directory and, therefore, no children will have to be displayed in the Current Node's Specified Rectangle.

If the Current Node has children, a Live Rectangle 120 is used to display the rectangles associated with the children of the Current Node. In other words, a portion of the Specified Rectangle is assigned or allocated to show the rectangles associated with the children. Once the location and dimensions of the Specified Rectangle are known, the location and dimensions of the Live Rectangle are also known.

Specifically, the location and dimensions of the Live Rectangle are calculated so that there is a small margin 140 between the two side and bottom edges of the Live and Specified Rectangles. The margin 130 between the tops of the Live and Specified Rectangles is made large enough to accommodate the Text Rectangle. These margins help the user see the nesting of the directories and files under the Current Node's directory.

However, while margins are preferred to make it easier to view the rectangles, they are not necessary. Thus, when it is said that the height and width of a rectangle inside the Specified Rectangle is less than the height and width of the Specified Rectangle, this is intended to mean that the heights and widths would have been essentially equal but for the presence of margins which extend around and within the perimeter of the Specified Rectangle. Likewise, when it is said that the height and width of an inside rectangle is less than the height and width of the Specified Rectangle, the difference in heights and widths is more than just the space occupied by the margin. rather there is some additional distance between the inside rectangle and margins (which may be occupied by a different inside rectangle as explained below).

Once the location and dimensions of the Current Node's Live Rectangle are determined, the program proceeds to determine how to best tile the Live Rectangle with the rectangles of the Current Node's children.

If the current node has children, then the program also creates "First" and "Last" pointers to point to the first and last child of the parent as shown in FIG. 7.

5. Preliminary Division Of Live Rectangle

Figure 9:
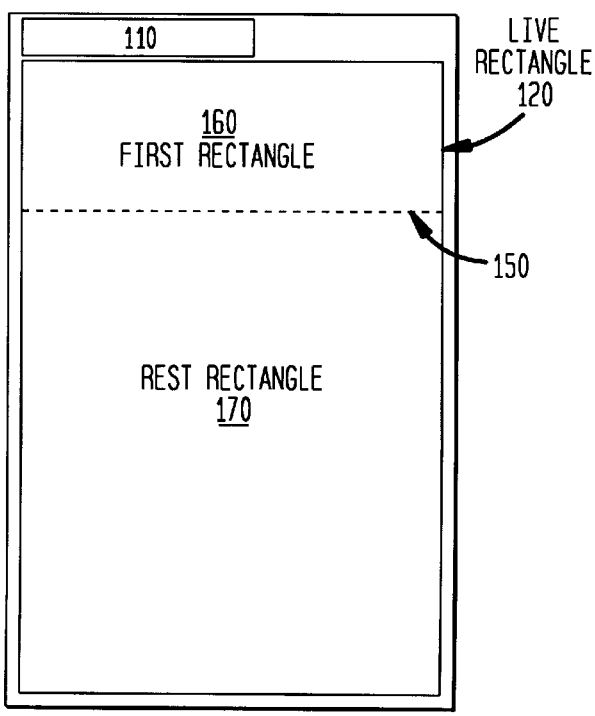
FIG. 9 is a schematic representation of dividing a Specified Rectangle into a First Rectangle and Rest Rectangle in accordance with a preferred embodiment of the present invention.

To determine how the Live Rectangle should be divided into separate pieces for each of the children, the program will initially assume that the first child is going to be shown in the top portion of the Live Rectangle. Specifically, the program calculates the proportion of the size of the first child to the current parent node and divides the Live Rectangle accordingly. Using the example of FIG. 7, this proportion is equal to the size of node c10 divided by the size of the parent node, i.e. $10/(10+9+8+7+6+5+4)=10/49$ or about 20%. As shown in FIG. 9, the program essentially draws a horizontal line 150 which divides the Live Rectangle 120 into two rectangles, namely a First Rectangle 160 and a Rest Rectangle 170, such that the area of First Rectangle 160 is 20% of the area of Live Rectangle 120. The rectangles 160 and 170 are so-named because the First Rectangle 160 will show the first child c10 and the Rest Rectangle 170 will show the rest of the children c4–c9.

6. Text Fit Testing

Once the First Rectangle is initially configured, the program looks to see how well the name of the first child will fit in the First Rectangle. If the text fits well, then the First Rectangle will become the first child's Specified Rectangle and the program will move on. Otherwise, if the text does not fit well, then the program will not use the First Rectangle to show the first child.

Figure 10:
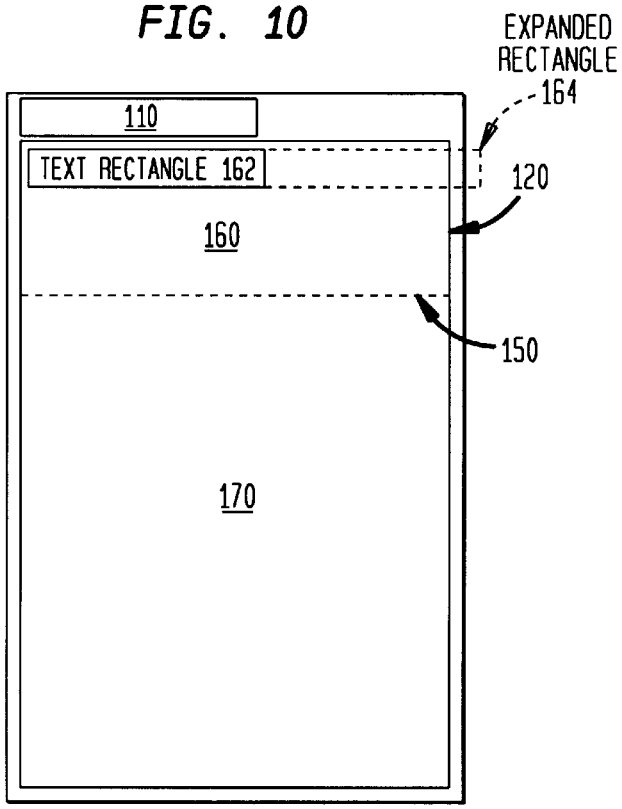
FIG. 10 is a schematic representation of determining whether a Text Rectangle and Expanded Rectangle fit within a Live Rectangle in accordance with a preferred embodiment of the present invention.

To test how well the text description fits, the program first determines whether the Text Rectangle 162 fits in First Rectangle 160, as shown in FIG. 10. (As used herein, one rectangle is said to "fit" in another rectangle when the height and width of the one rectangle are equal to or smaller than the height and width of the other rectangle.) The program next determines whether an Expanded Rectangle 164, which is preferably 1.5 times the width of the Text Rectangle 162, fits within the First Rectangle 160.

Depending on whether or not the Expanded Rectangle fits within the First Rectangle, either the "booking" or "binary" method will be used. Specifically, if the Text Rectangle 162 fits in the First Rectangle 160 but the Expanded Rectangle 164 does not (FIG. 14), then the "booking" method will be used to tile the first child into the Specified Rectangle. Otherwise, the "binary" method will be used for the children. Both methods are explained below.

7. Booking Method

If the Text Rectangle fits within the First Rectangle but the Expanded Rectangle does not, then the description of the first child will fit rather snugly within the First Rectangle. In other words, the First Rectangle 160 is not much wider nor thinner than the text to be displayed in the rectangle. This is called the "booking" method of tiling because, like most books, the title is generally the same size or a little shorter than the length of the spine. Accordingly, the look and dimension of the rectangles may be adjusted by changing the dimensions of the Text Rectangle and ratio of the Expanded Rectangle to Text Rectangle.

Figure 11:
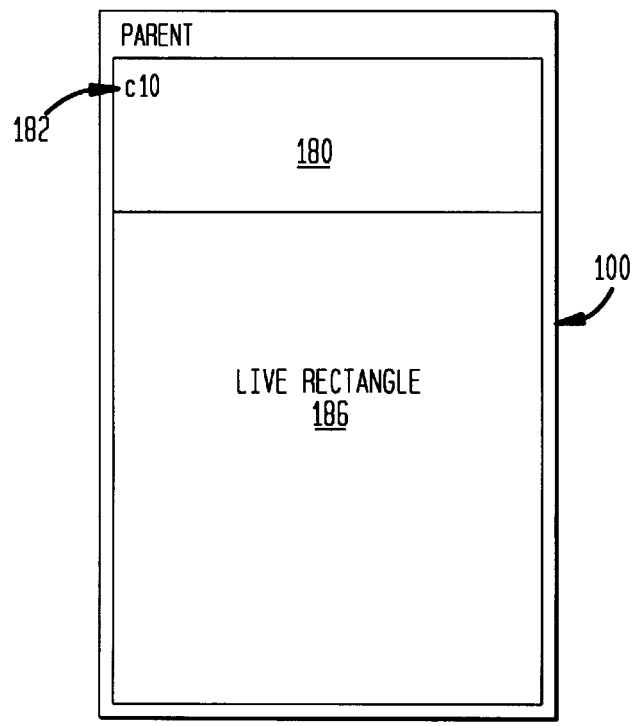
FIG. 11 is a schematic representation of a Specified Rectangle in accordance with a preferred embodiment of the present invention.
Figure 12:
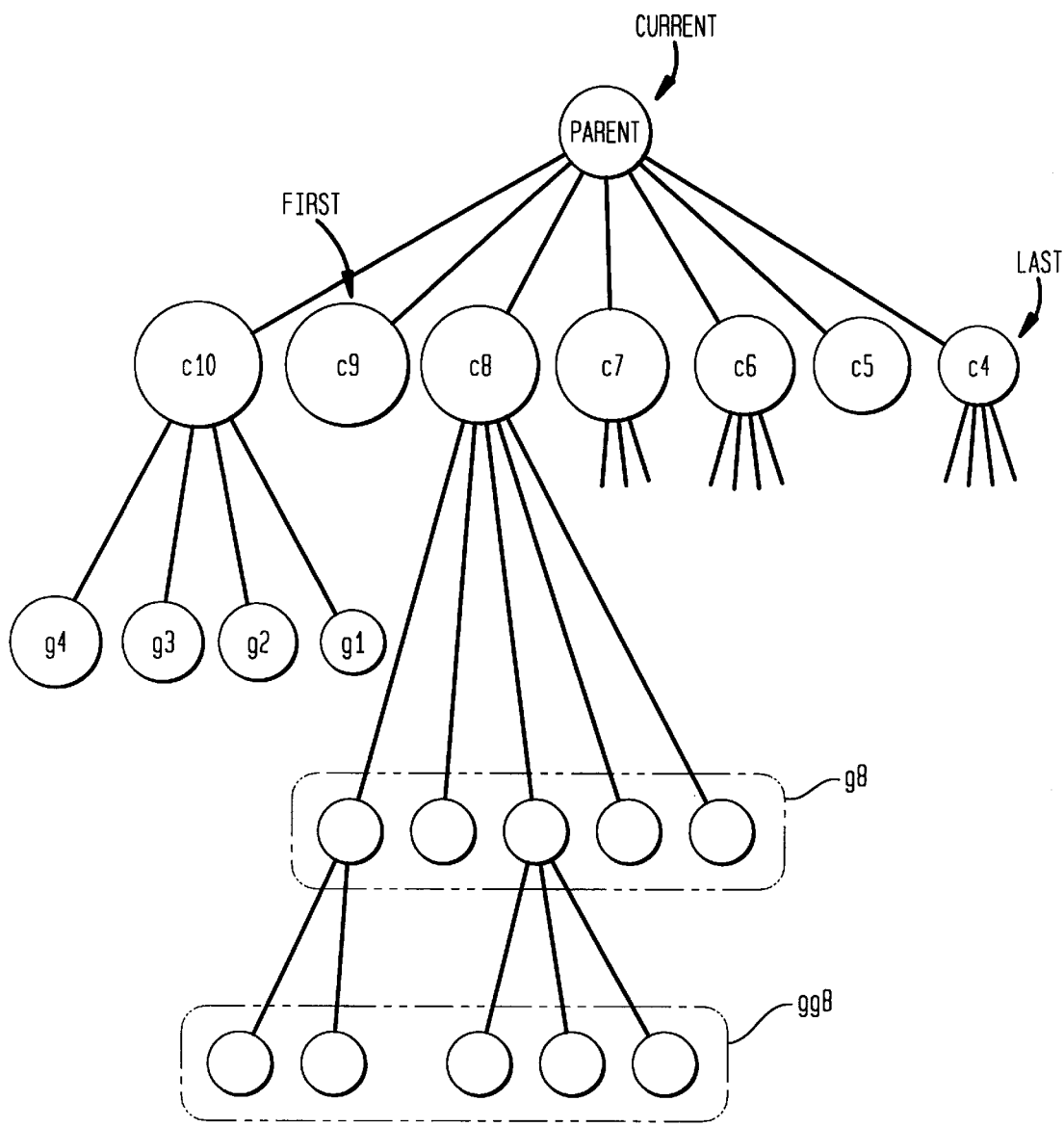
FIG. 12 is a schematic representation of a tree data structure to be displayed in accordance with the present invention.

Using the booking method, the First Rectangle 160 will simply become the Specified Rectangle 180 of the first child c10 (FIG. 11). Further, since the First Rectangle is now occupied by the first child, the Rest Rectangle 170 of the Live Rectangle 120 (FIG. 9) is now ready to be tiled by the rest of the children. Specifically, the new Live Rectangle 186 (FIG. 11) is redefined to be equal to the previous Rest Rectangle 170 (FIG. 9). The program then moves on to the next child of the parent, i.e. c9. As shown in FIG. 12, the program accomplishes this by moving the First pointer from the previous first child c10 to the next child c9. The program then performs the same process on c9 through c4 as it did on c10 through c4, starting at the "Preliminary Division of Live Rectangle" step.

The program will continue creating Specified Rectangles for all of the children of the parent node and moving the pointers accordingly. Finally, after the last child node has been processed, the program will know it is done with the children of the Current Node because the First pointer and Last pointer will point at the same node.

8. Binary method

As mentioned above, the booking method is not always used to tile. Rather, if the Expanded Rectangle does fit in the First Rectangle or if the Text Rectangle does not fit in the First Rectangle, then the "binary" method is used. Essentially, the binary method divides the Live Rectangle in two along its longest side and places the children in these two new squarish-rectangles.

Figure 13:
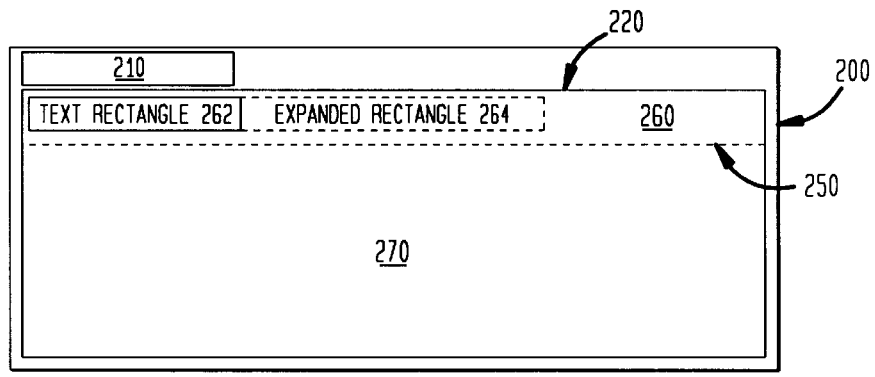
FIG. 13 is a schematic representation of determining whether a Text Rectangle and Expanded Rectangle fit within a Live Rectangle in accordance with a preferred embodiment of the present invention.
Figure 17:
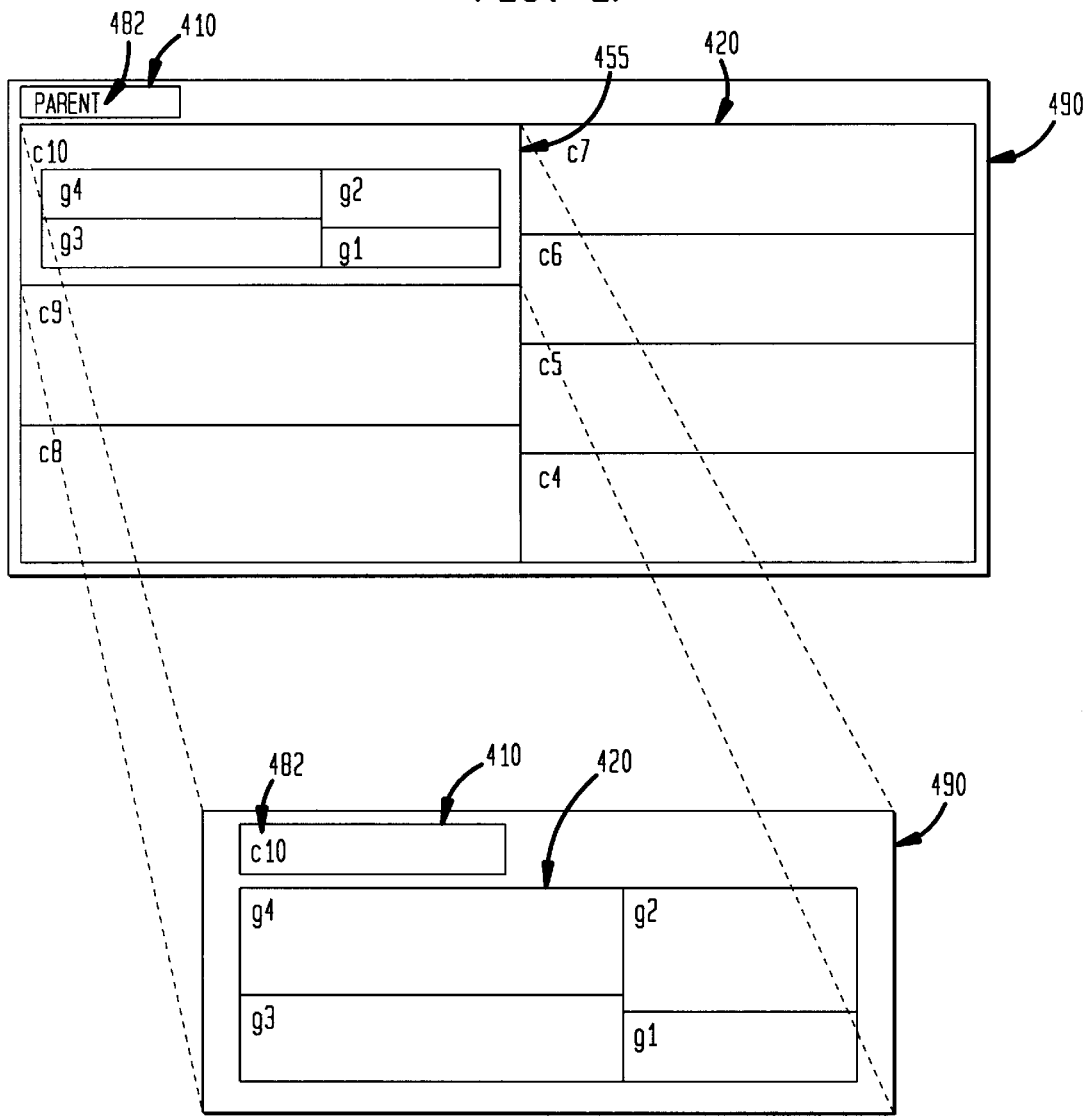
FIG. 17 is a schematic representation of a Specified Rectangle and child rectangles within the Specified Rectangle in accordance with a preferred embodiment of the present invention.

For example, assume that the Specified Rectangle of the parent node does not have the shape shown in FIG. 12, but is rather substantially wider and shorter as shown in FIG. 13. In this instance, during the "Preliminary Division Of Live Rectangle" step, the Live Rectangle 220 will be divided at line 250 so that the First Rectangle 260 of node c10 still occupies 20% of the area of the Live Rectangle 220. As is apparent, First Rectangle 260 of FIG. 17 is much wider and shorter than First Rectangle 160 of FIG. 10. Thus, during the "Text Fit Testing" step, the program will determine that Text Rectangle 262 and Expanded Rectangle 264 both fit within First Rectangle 260 (in contrast to FIG. 10 where Expanded Rectangle 164 did not fit within First Rectangle 160). Accordingly, First Rectangle 260 is not considered to be a good fit for Text Rectangle 262 because the First Rectangle is too wide and, therefore, First Rectangle 260 will not be used to display first child c10.

Figure 14:
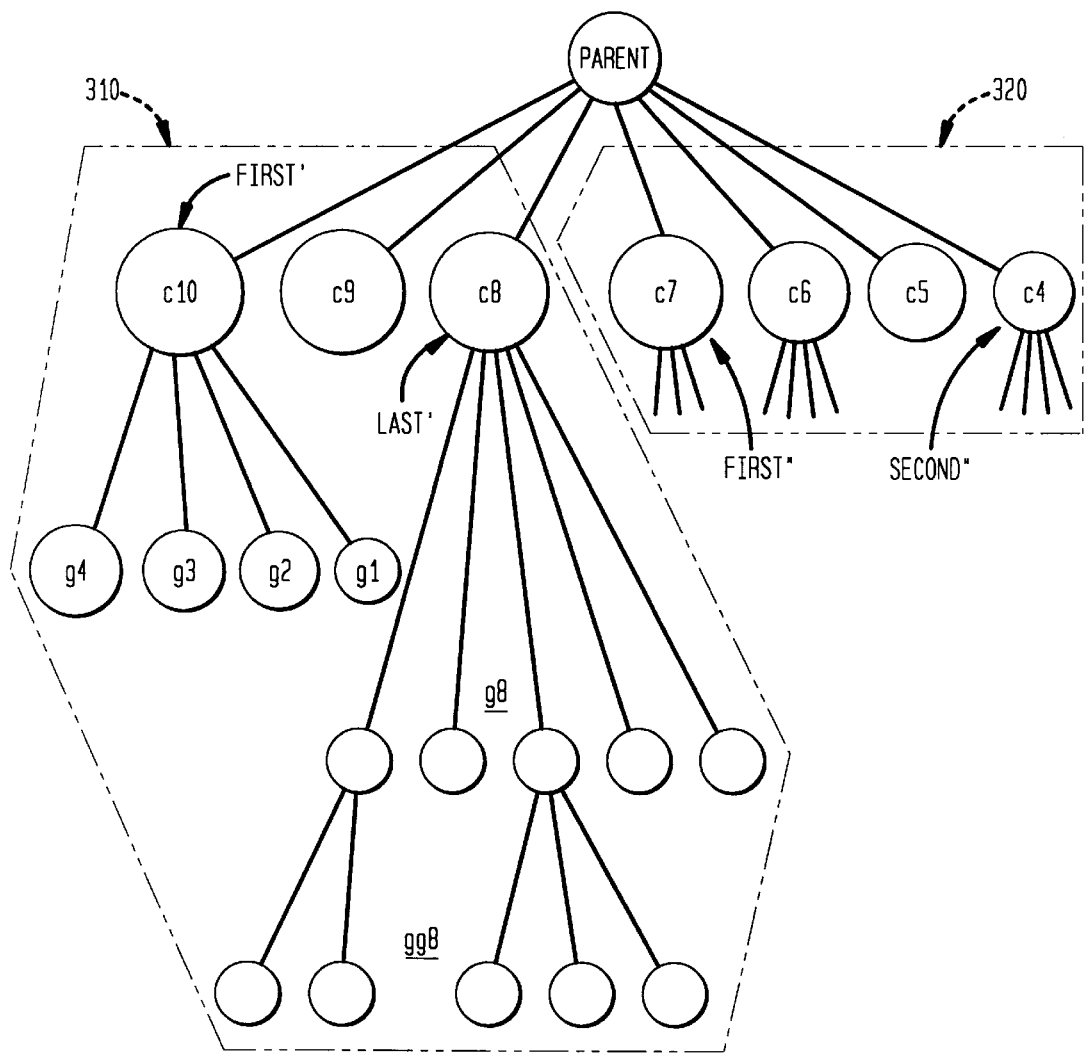
FIG. 14 is a schematic representation of grouping a tree data structure in accordance with the present invention.

Therefore, the program splits the Live Rectangle 220 in two before it is tiled with the children. In the binary method, the children of the parent node are split into two groups, with all of the larger nodes being placed in one group and all of the smaller nodes being placed in the second group. The point of division is chosen so that the sum of the node sizes in the first group is as equal as possible to the sum of the node sizes in the second group. As shown in FIG. 14, child nodes c10, c9 and c8 will be put in the first group 310 having a total size of 10+9+8=27 and child nodes c7, c6, c5 and c4 are placed in a second group 320 having a total size of 7+6+5+4=22.

Figure 15:
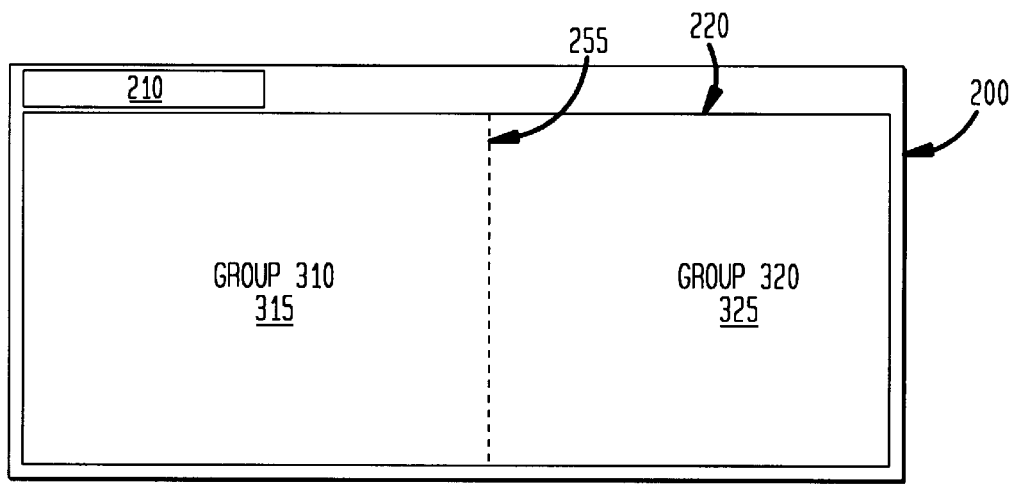
FIG. 15 is a schematic representation of dividing a Specified Rectangle into Group Rectangles.

As shown in FIG. 15, once the two groups are created, the longer side of the Live Rectangle 220 is divided at line 255 to form two rectangles 315 and 325 which reflect the respective sizes of groups 310 and 320. The area of the first group rectangle 315 is 27/(27+22) or about 55% of the total area of the Live Rectangle 220. By dividing the Live Rectangle at the longer side, the group rectangles are more square than long and thin.

Each group rectangle 315 and 325 is then tiled with the nodes of that group. The program does this by temporarily changing the First and Last Pointers to point to the first and last pointers of the group to be tiled. As shown in FIG. 14, if the first group 310 is processed first, then the new First' pointer will point to node c10 which is the first child in the first group 310 and the new Last' pointer will point to the last child in the first group which is node c8. Moreover, the Live Rectangle is now set to be equal to the first group's rectangle 315. The program then repeats the process over again starting from the "Preliminary Division Of Live Rectangle" step as if the parent node only had three children, i.e., the children of the first group. The program continues until all of the nodes in the first group are tiled. In this fashion, all of the nodes of the first group will be tiled into the first group rectangle.

Once all of the nodes of the first group 310 are tiled into its rectangle 315, the nodes of the second group 320 will then be tiled into their rectangle 325. Specifically, a new First" pointer is set to point to node c7 which is the first child in the second group and a new Last" pointer will point to node c4 which is the last child in the second group (FIG. 14). The Live Rectangle is then set to be equal to the second group's rectangle 325. The program then repeats the above process starting from the "Preliminary Division Of Live Rectangle" step as if the parent node only had the children contained in the second group, and continues until all of the nodes in the second group are tiled. Once the second group 320 has been tiled into the second group rectangle 325, the Live Rectangle 220 of the Specified Rectangle 200 of parent node will have been filled in with all of its children's rectangles.

The simplest case is where a group only has one child. In that instance, the Specified Rectangle of that child will simply be set equal to the entire group rectangle. By way of example, if node c10 was the only member of group 310, then c10's Specified Rectangle would simply be set equal to group rectangle 315 and the second group would be processed next.

In an alternative preferred embodiment, the Live Rectangle could be split into more than two pieces if the circumstances warrant. For example, if the Live Rectangle were three times as long as it is high and the nodes could be split into three relatively equal groups, the Live Rectangle could be split into three group rectangles which would be more square than dividing the Live Rectangle into two pieces.

9. Combinations of Booking and Binary

Figure 16:
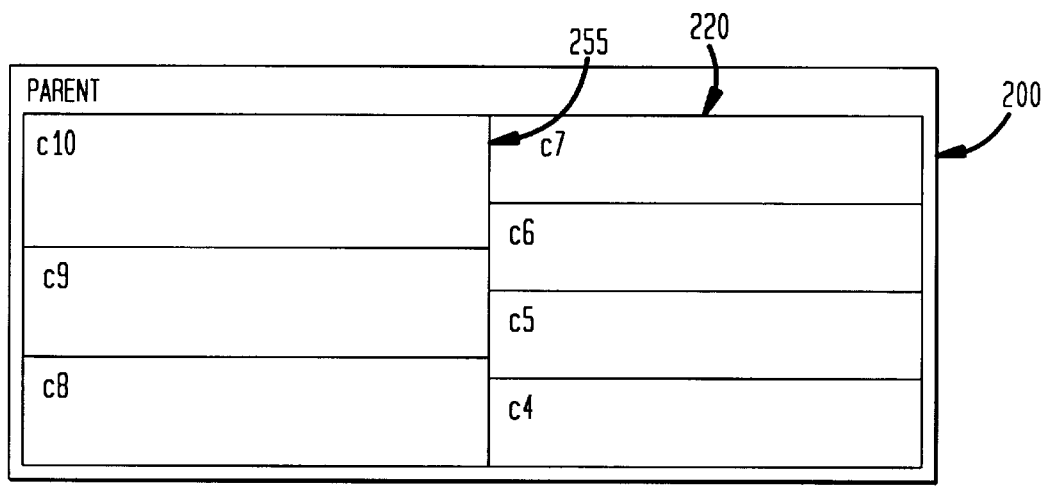
FIG. 16 is a schematic representation of a Specified Rectangle in accordance with a preferred embodiment of the present invention.

FIG. 16 illustrates how the two groups 310 and 320 may be tiled into Specified Rectangle 200. It will be noted that in the examples of FIGS. 17–20, the binary method was initially used to divide Live Rectangle 220 of the parent node into two group rectangles 315, 320. In the scenario shown in FIG. 16, the two group rectangles had dimensions which enabled the booking method to be used to fill up the group rectangles.

Thus, when the viewing area 20 is tiled with all of the various parent, child and grandchild nodes, it is likely that the binary and booking methods are both used in various combinations throughout the viewing area. Moreover, although the example of FIGS. 13–16 had an instance where the binary method was used once and then immediately followed by the booking method, that will not always be the case. It may well happen that the binary method does not make group rectangles which are automatically the right shape for using the booking method. If so, the binary method will be used to split the group rectangles and the process will continue.

Accordingly, the present invention tiles the child rectangles in accordance with two different styles depending on how the Text Rectangle fits in the proposed child rectangle. If the Text Rectangle does not fit well, then the parent's rectangle is first split into two pieces such that any given child rectangles does not take up a whole side of the parent, i.e., both the height and width of the child are smaller than respective height and width of the parent. On the other hand, if the Text Rectangle does fit well, then the child rectangle will be placed in the rectangle such that the width of the child is about equal to the width of the parent and/or the height of the child is about equal to the height of the parent. For the purposes of this disclosure, the height and width of a child rectangle is considered equal to the height and width of the parent rectangle if the only difference between the two rectangles is the presence of margin such as margins 130 and 140.

For example, it has been determined that when the average ratio of the longest side to the shortest side of a rectangle is 3, this ratio is particularly suited to display the nodes. Moreover, when using the parameters and methods identified above, rectangles having this ratio or less will generally be achieved.

10. Recursion

The foregoing illustrations have not taken into account that many of the child nodes c4–c10 have their own children. For example, as shown in FIG. 6, node c10 has grandchildren nodes g1–g4 which must be tiled within c10's Live Rectangle. The well-known programming method of recursion is used to draw the grandchildren and great grandchildren. The foregoing method was used to tile the child nodes c4–c10 of the parent node. Likewise, the same method may be used to tile the grandchild nodes g1–g4 because these nodes are simply children which have node c10 as their parent. Similarly, great-grandchildren nodes gg8 are the children of the grandchildren nodes g8.

The recursive step may be considered to occur anytime after the location and size of a Specified Rectangle has been created for any node. For example, assume that the program has reached a point where it has just determined the location and size of the Specified Rectangle for node c10 of FIG. 6. The binary and booking methods as described above state that the program will usually proceed to the next child c9 once the Specified Rectangle of c10 has been configured. However, before the program actually proceeds to child c9, the program will first determine whether the current child c10 has children of its own. If so, the program will repeat the entire process over again starting at the "Creation of Text Rectangle" step as if c10 were the parent node and g1–g4 were the children. The only substantive difference will be that instead of setting the new parent node's Specified Rectangle to be the shape and size of the entire viewing area 20, the location and dimensions of c10's Specified Rectangle will be used. The program will not move on to child c9 until Specified Rectangles have been created for all of c10's descendants.

FIG. 17 illustrates the similarity between the Specified Rectangles 490 of node c10 and the Specified Rectangle 400 of the parent node. Both have their own Text Rectangles 410 for displaying the names 482 of the nodes as well as Live Rectangles 420 for displaying the rectangles of the children of the nodes.

11. Hiding small files

Preferably, the invention includes a number of options which further increases the user's ability to easily view the contents of the storage media. For example, some rectangles may be only a few pixels large and too small to be perceived on the screen. The program addresses this problem by suppressing the display of nodes which are too small.

Generally, the user will set a minimum rectangle side which represents the smallest rectangle side which they wish to see on the screen. For example, the program may have a default minimum rectangle side so that any nodes having a rectangle with a side smaller than 5 pixels is suppressed (the "Minimum Square"). The program accordingly finds the smallest node which fits that Minimum Square size by finding the child node whose size as a proportion to the Current Node size is larger than the area of the Minimum Square as a proportion to the Live Rectangle size. All the child nodes which are smaller than the Smallest Child are marked as "Hidden." The program will not compute the Specified Rectangle of any node which is marked as hidden. However, in order to ensure that rectangle space is properly allocated to the hidden files, a new child node called "Small Files" is created. The size of the Small Files node is set equal to the sum of the children marked Hidden. Moreover, when the program encounters a Small Files node, the program will show a special icon in place of the name of the node to inform the user that that rectangle represents more than one directory or file.

Figure 18:
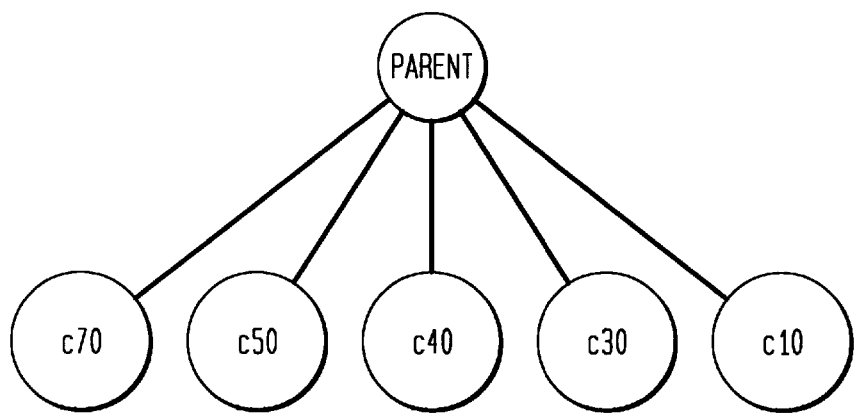
FIG. 18 is a schematic representation of a tree data structure to be displayed in accordance with the present invention.
Figure 19:
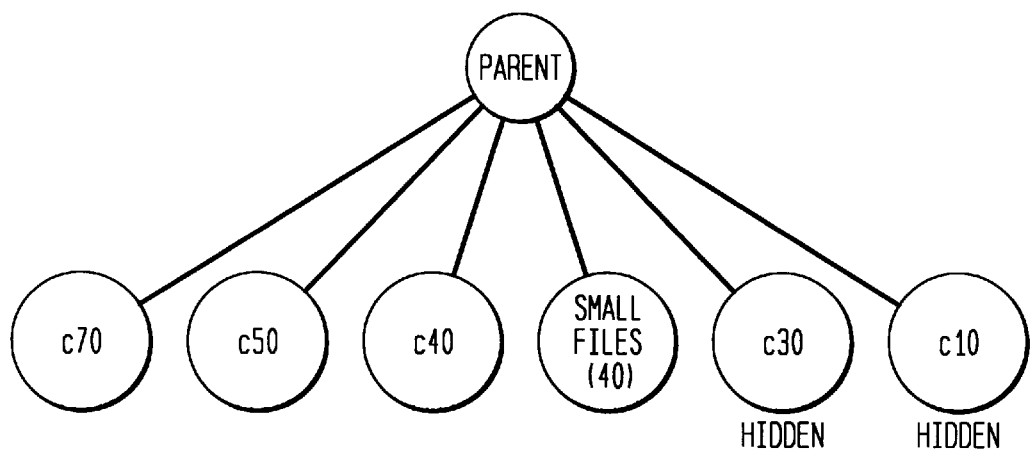
FIG. 19 is a schematic representation of a tree data structure in accordance with the present invention.
Figure 20:
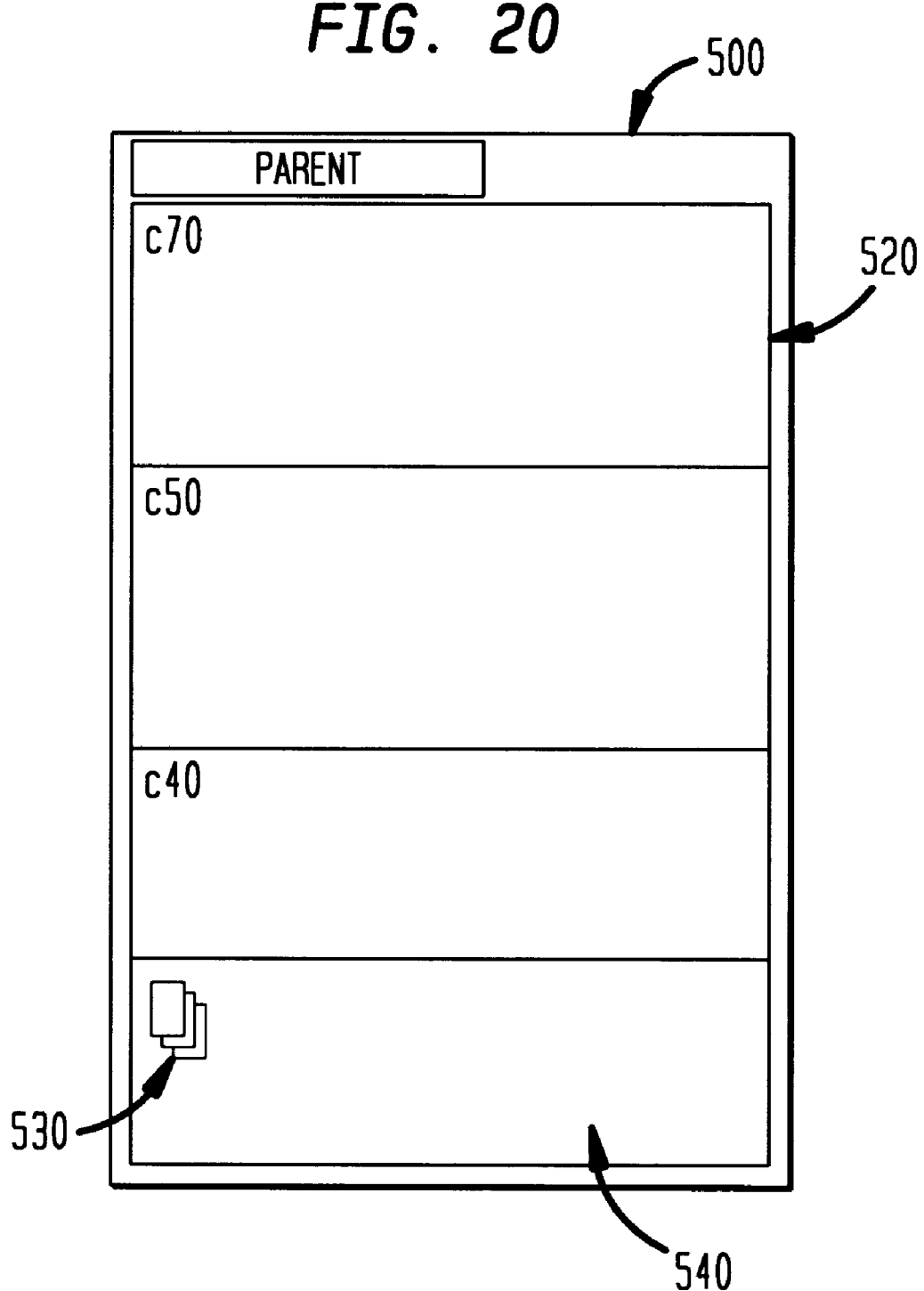
FIG. 20 is a schematic representation of a Specified Rectangle in accordance with another preferred embodiment of the present invention.

Using the example of FIG. 18, assume that the Live Rectangle of the parent node has an area of 100 pixels to display the rectangles of children c70, c50, c40, c30 and c10. Further assume that the user does not want to see any Specified Rectangles which are less than 4×4 pixels, i.e. have an area less than 16 pixels. If so, then node's c30 and c10 will be marked as Hidden because the proportion of their size as compared to the parent (30/200=15% and 10/200= 5%) is less than proportion of the size of the minimum rectangle to the Live Rectangle (16 pixels/100 pixels=16%). As shown in FIG. 19, these nodes will be marked as "Hidden" and a new node called Small Files and having a size of 40 (which is equal to the sum of the sizes of c30 and c10) will be inserted in sorted order as a child to the parent node. As shown in FIG. 20, the non-hidden nodes c70, c50 and c40 will be tiled into the parent's Live Rectangle 520 as described above. A Specified Rectangle 540 will also be created for the Small Files Node, but icon 530 will be displayed instead of the node's name. No rectangles are created for hidden nodes c30 and c10.

13. Vertical windows

As shown in FIG. 9 and as described in the "Preliminary Division Of Live Rectangle" step, the Live Rectangle 120 is initially split horizontally by line 150. However, before the Text Fit Testing step occurs, the program will preferably try to determine whether a vertical split is better to show the name of the first child.

Figure 21:
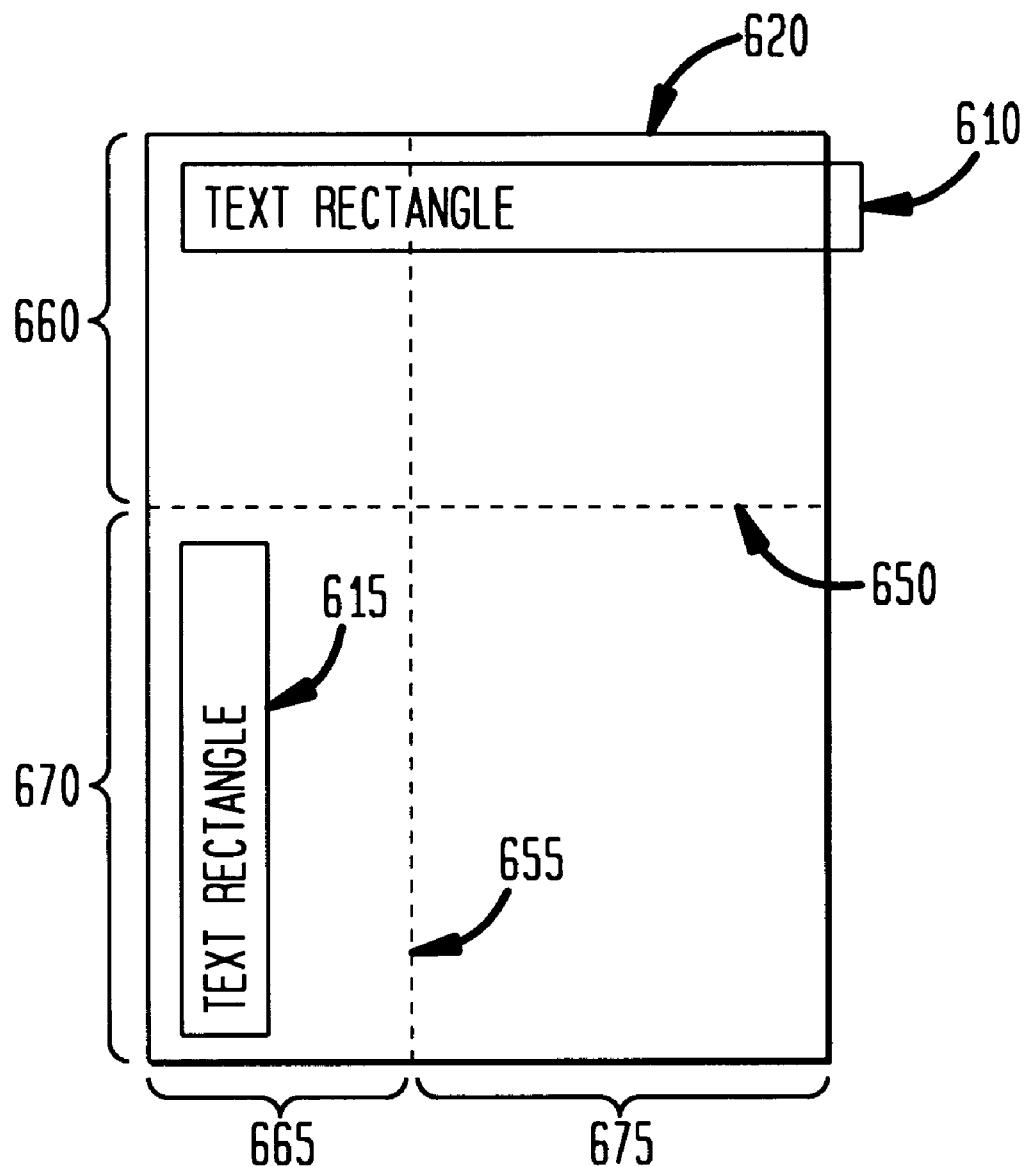
FIG. 21 is a schematic representation of a determining placement of Text Rectangle in accordance with yet another preferred embodiment of the present invention.

As described above in the "Preliminary Division Of Live Rectangle" step, the program first uses horizontal line 650 to divide the Live Rectangle 620 into a First Rectangle 660 and a Rest Rectangle 670. If the Text Rectangle 610 can not fit in the Live Rectangle 620 when it is split horizontally, the program next determines whether the Text Rectangle could fit in the Live Rectangle vertically. As shown in FIG. 21, the program does this by creating a vertical line 655 to split the Live Rectangle into a vertical First Rectangle 665 and a vertical Rest Rectangle 675. The vertical rectangles have the same areas as their respective horizontal rectangles. The program next determines whether the Text Rectangle 615 could fit in the First Rectangle 665 vertically. If so, vertical First Rectangle 665 will become the First Rectangle, vertical Rest Rectangle 675 will become the Rest Rectangle, and the program will proceed to the Text Fit Testing step. The only difference will be that when the name of the child is displayed in the Text Rectangle 615, the name will be shown rotated 90 degrees.

14. Colors

Preferably, the colors of the rectangles correspond with some attribute of the file or directory. For example, the file's or directory's color may change depending on the nesting depth. Alternatively, the color may change depending on the file's or directory's age or any other attribute of the corresponding file or subdirectory.

As mentioned previously, the foregoing steps broadly describe some of the major functions of the method of the present invention. These steps generally correspond with the routines of the attached source code as follows:

| Step(s) | Routine |
| --- | --- |
| Creation of tree data structure | LoadSubdirectoryFromDisk; SortChildrenInSizeOrder |
| Preliminary Division Of Live Rectangle | ShowMapFilesScreen:PreliminaryDivision |
| Text Fit Testing | ShowMapFilesScreen:TextFitTesting |
| Booking Method | ShowMapFilesScreen:BookingMethod |
| Binary method | ShowMapFilesScreen:BinaryMethod |
| Recursion | ShowMapFilesScreen:ShowMapDirectory Screen; LoadSubdirectgoryFromDisk; SortChildrenInSizeOrder |
| Hiding small files | AddSmallFilesNode |

The present invention provides a wide number of advantages. For example, the program displays directories and files of a storage medium in a graphical interface using nested rectangles. The size of each rectangle represents the proportional size of the directories or files and the nesting of each rectangle represents the branched-tree structure of the manner of storing the directory and file.

The present invention further tiles these rectangles in a manner which optimizes the readability and usefulness of the display. The invention balances the importance of a variety of factors, including: maximizing those number of rectangles which have dimensions capable of displaying the names of directories and files; promoting the creation of squarish rectangles so that the user can easily compare the relative sizes of two rectangles; minimizing the number of very long and thin rectangles; preventing directories or files from being shown if they are so small that their rectangles will clog the display with imperceptible information; and choosing colors which provide useful information. The program strikes a balance between all of these considerations.

The invention allows the user to easily see and identify which directories are taking the most space. Large or not-recently-used chunks of information can be identified, deleted, compressed or archived in order to free valuable storage space. The ease of being able to see where file space is allocated assists the user in avoiding the time, expense, and risk (such as to data) of buying and installing larger storage devices.

The invention further allows the user to see a map of the entire hard drive of a personal computer in the limited amount of space of a computer screen. Because of the manner in which the data is displayed, the invention is also a useful device for teaching computer novices about tree structured information.

The present invention has the further advantage of being able to be used with any number of different computers and storage mediums. For example, while the preferred platforms are Windows 3.x and Windows 95 on 386 or higher computers, the program may be adapted for Apple Macintosh and other systems. The invention can also be easily translated as an add-in inside a standard file manager such as the Windows 97 Explorer.

The program also does not exacerbate one of the problems it addresses: preventing the unnecessary use of extensive storage space. The attached executable version of the source code only occupies about 600 Kb of disk space.

The present invention a 1 so presents the advantage of utilizing a wide number of options. For example, in addition to showing the name of the file or directory in each rectangle, invention may allow the rectangle to alternatively show other information such as the age, access attributes or other useful information.

The program may further be configured to only display certain desired information. For example, a filter may be applied so that the invention only displays all directories and files satisfying a specific criteria, such as files having a specific extension. Even if only a few of the files are shown, those that are shown can still be displayed in a nested relationship to illustrate the files' respective directories. Other conditions may also be applied, and these conditions may be applied not just at the file level, but at the directory and subdirectory level as well. These conditions may include whether a name starts with a certain letter, when the file or directory was last accessed and how big the file or directory is. Another filter would only show files for which there are duplicates (another feature would show all the files but draw a line between the duplicates). The subroutine RecalcFilter of the attached source code represents one preferred embodiment of this method.

The program may also be configured so that the user may choose to only show the directories and files under a particular directory as compared to the entire storage device. In other words, for any selected directory, the program may zoom in so that the selected directory will fill the entire viewing area 20 for closer examination. A zoom-out command is also provided so that the parent of the selected file or directory fills the entire viewing area 20. The program would perform the zoom-in command by using the steps described above, but would substitute the target directory for the root directory. When zoomed-in, the user may also have the option of showing an outline of the currently selected rectangle as if the directories of the root directory were shown, so that even though the user has enlarged all of the rectangles of the currently selected directory, the user can still see the relative size of the currently-selected rectangle compared to the entire disk drive.

Another feature includes advising the user which files are ripe for deletion (i.e., not recently accessed and large data files) and which the user should be cautious in deleting (i.e., executable versions of programs). Yet another feature would allow the user to select the depth of nesting shown. For example, the user could choose to show only one level of nesting so that only the directories and files immediately under the root directory are shown. In yet a further option, the rectangles could show a representation of the data contained in the associated file, such as showing a portion of the text when the file represents a document or a picture when the file represents a picture.

The invention also serves as a standard file manager for copying, moving, and otherwise managing files. For example, as represented in the attached source code, the user may select which subdirectory is to be mapped, select individual files, show information about files that are too small to see on the map drag files to and from the map and perform other file management operations.

The program may also be modified to continuously monitor the amount of free space on the disk drive so the user can be warned when disk space is lower than a value or percentage specified by the user. This helps users avoid error conditions that result from running out of free space. In this instance, the program could run in the background on start-up so that the program is constantly monitoring disk space even if the user is not looking at the program's screen.

Moreover, it is not required that the nodes of the tree data structure be displayed rectangles. For example, the program could be modified so that it displays ellipses which, of course, have heights and widths. Other shapes such as circles are also possible.

Another advantage of the present invention is that it has wide application beyond those showing files and directories on a storage medium. The invention can be used to graphically represent any tree data structure stored in some medium where the nodes contain numerical information. For example, a city could be represented by neighborhoods, streets and houses where the numerical quantity is acreage. Another application includes displaying Internet link connections, where each node represents a web page and the children represents links to other web pages. The numerical quantity associated with the node pages could vary with, for example, with the amount of data contained by the web page. Alternatively, the numerical quantity associated with the "leaves" of the tree data structure (i.e., nodes having no children) could be set to a constant such as one and the nodes of the tree with children would be set equal to the sum of their descendants. If so, the size of the associated rectangles would be proportional to the number of the descendants. Database tables which were converted to trees could also be displayed.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

We claim:

1. A computer implemented method of displaying information stored in a tree data structure stored in a computer storage medium, comprising:
   (a) providing a tree data structure comprising nodes, said data structure having a relationship whereby any one node may contain one or more other nodes, each said node having a numerical quantity associated with a node, whereby said numerical quantity associated with said node is proportional to the amount of space occupied on said computer storage medium,
   (b) providing a parent node in said data structure,
   (c) providing a child node in said data structure, said child node being contained in said parent node,
   (d) displaying said parent node on an output medium as a parent shape having a height, width and area, the area of said parent shape being proportional to the numerical quantity associated with said parent node,
   (e) displaying said child node on an output medium as a child shape having a height, width and area, the area of said child shape being proportional to the numerical quantity associated with said child node, and
   (f) said height of said child shape being less than said height of said parent shape and said width of said child shape being less than said width of said parent shape.

2. The method of claim 1 wherein said nodes represent directories and files stored on a computer storage medium and said numerical quantity associated with a node is proportional to the amount of space occupied by the associated directory or file on said computer storage medium.

3. The method of claim 1 wherein said nodes represent links to sites on a network.

4. The method of claim 3 wherein said network is the World Wide Web, said nodes represent web pages containing links to other web pages, the numerical quantities of nodes without children are equal to one another, and the numerical quantity of nodes with children is equal to the sum of the numerical quantities of the nodes contained by the node with children.

5. A computer implemented method of displaying information stored in a tree data structure stored in a computer storage medium, comprising:
   (a) providing a tree data structure comprising nodes, said data structure having a relationship whereby any one node may contain one or more other nodes, each said node having a numerical quantity associated with a node, whereby said numerical quantity associated with said node is proportional to the amount of space occupied on said computer storage medium,
   (b) providing a parent node in said data structure,
   (c) providing a child node in said data structure, said child node being contained in said parent node,
   (d) displaying said parent node on an output medium as a parent shape having a height, width and area, the area of said parent shape being proportional to the numerical quantity associated with said parent node,
   (e) assigning a portion of said parent shape, at least a portion of said assigned portion for displaying a shape associated with said child node,
   (f) determining whether the width of said assigned portion is greater than a first predetermined amount and less than a second predetermined amount,
   (g) if said width of said assigned portion is less than a first predetermined amount or greater than a second predetermined amount, then displaying said child node on an output medium using a binary display method, and
   (h) said binary display method comprising displaying said child node as a child shape within said assigned portion, said child shape having a height, width and area, the area of said child shape being proportional to the numerical quantity associated with said child node and said height of said child shape being less than said height of said parent shape and said width of said child shape being less than said width of said parent shape.

6. The method of claim 5 wherein said medium is a computer storage medium, said nodes represent directories or files, and said numerical quantity associated with a node is proportional to the amount of space occupied by the associated directory or file on said computer storage medium.

7. The method of claim 5 wherein the width of said assigned portion is about equal to the width of said parent shape and the height of said assigned portion is less than the height of said parent shape.

8. The method of claim 7 wherein if said width of said assigned portion is greater than said first predetermined amount and less than said second predetermined amount, then said method further comprises displaying said child node on an output medium using a booking display method, said booking display method comprising displaying said child node on an output medium as a child shape having a height, width and area equal to the height, width and area of said assigned portion.

9. The method of claim 8 wherein said step of determining whether the width of said assigned portion is greater than said first predetermined amount and less than said second predetermined amount comprises (a) providing a text shape having a width, (b) computing an expanded shape having a width larger than the width of said text shape, (c) determining whether the width of said text shape is less than the width of said assigned portion, (d) determining whether the width of said expanded shape is greater than the width of said assigned portion.

10. The method of claim 9 wherein the width of said expanded shape is about 1.5 times the width of said text shape.

11. The method of claim 5 wherein, if the width of said assigned portion is less than a first predetermined amount or greater than a second predetermined amount, then said binary method further comprises dividing said assigned portion into a first group shape and a second group shape each having a width, height and area, such that said width of said group shapes is less than said width of said assigned portion and said height of said groups shapes is about equal to said height of said assigned portion and displaying said child shape in one of said group shapes.

12. The method of claim 11 wherein said data structure further comprises a secondary node contained in said parent node but not contained in said child node, and further comprising displaying a shape associated with said secondary node in said second group shape.

13. The method of claim 12 further comprising providing additional nodes contained in said parent node but not contained in said child node or secondary node, allocating each of said child, secondary and additional nodes into a first group or second group such that the smallest numerical quantity associated with a node in said first group is greater than the largest numerical quantity associated with a node in said second group, and displaying said nodes of said first group as shapes in said first group rectangle and displaying said nodes of said second group as shapes in said second group rectangle.

14. The method of claims 5, 6, 8 and 13 wherein said shape is rectangular.

15. The method of claim 5 wherein said child shape is only displayed if said height and width of said child is greater than a minimum amount.

16. The method of claim 5 further comprising displaying text describing said parent node in said parent shape and displaying text describing said child node in said child shape.

17. The method of claim 16 wherein said text describes the name of a directory or file associated with said node.

18. The method of claim 16 wherein said text describing said parent node is displayed vertically within said parent shape.

19. The method of claim 16 wherein said text describing said parent node is displayed horizontally within said parent shape.

20. The method of claim 5 wherein said output medium is a computer screen.

21. The method of claim 20 wherein said height represents a vertical distance on said output medium.

22. The method of claim 20 wherein said height represents a horizontal distance on said output medium.

23. The method of claim S wherein substantially all of said nodes of said structure are displayed as shapes by recursively repeating said steps of said method as if each node containing other nodes is said parent node.

24. The method of claim 5 wherein said steps of displaying further comprises displaying said shapes as colors dependent upon an attribute of the node.

25. The method of claim 24 wherein said color of a shape associated with a particular node is dependent upon how many nodes contain said particular node.

26. A computer implemented method of displaying parent directories or files and child directories or files contained on a storage medium, whereby said child directories are contained within said parent directories, said method comprising:

(a) providing a computer screen having a resolution for displaying information stored in a tree data structure;

(b) displaying said parent directories in said tree data structure as rectangles, the area of each rectangle being proportional to the amount of space on the storage medium occupied by the associated parent directory;

(c) displaying said child directories in said tree data structure as rectangles, the area of each rectangle being proportional to the amount of space on the storage medium occupied by the associated child directory, and displaying the rectangles of said child directories within said rectangles of the parent directories which contain the child directories, and (d) calculating the height and width of said rectangles so as to maximize the number of rectangles which can be displayed on said computer screen.

* * * * *

UNITED STATES PATENT AND TRADEMARK OFFICE
CERTIFICATE OF CORRECTION

PATENT NO. : 5,987,469
DATED : November 16, 1999
INVENTOR(S) : James D. Lewis et al.

It is certified that error appears in the above-identified patent and that said Letters Patent is hereby corrected as shown below:

Title page.

Abstract,
Line 3, after "such" insert -- as --.

Column 6,
Line 3, "rather" should read -- Rather,--.
Line 52, "14" should read -- 10--.

Column 7,
Line 30, "12" should read -- 10 --.
Line 36, "17" should read -- 13 --.

Column 9,
Line 4, "rectangles" should read -- rectangle --.

Column 10,
Line 30, after "than" insert -- the --.

UNITED STATES PATENT AND TRADEMARK OFFICE
CERTIFICATE OF CORRECTION

PATENT NO.   : 5,987,469
DATED        : November 16, 1999
INVENTOR(S)  : James D. Lewis et al.

It is certified that error appears in the above-identified patent and that said Letters Patent is hereby corrected as shown below:

Column 12,
Line 5, "a l so" should read -- also --.
Line 8, after "rectangle," insert -- the --.
Line 62, "map" should read -- map --.

Column 13,
Line 19, "represents" should read -- represent --.
Line 21, cancel the word "with".

Column 16,
Line 15, "S" should read -- 5 --.

Signed and Sealed this

Thirty-first Day of July, 2001

*Attest:*

*Nicholas P. Godici*

NICHOLAS P. GODICI
*Attesting Officer*   *Acting Director of the United States Patent and Trademark Office*